(12) United States Patent
Katsurada

(10) Patent No.: US 7,938,022 B2
(45) Date of Patent: May 10, 2011

(54) FLOWMETER WITH AN OSCILLATION CIRCUIT RECEIVING ELECTRIC POWER IN A NON-INSULATING MANNER

(75) Inventor: Masaaki Katsurada, Osaka (JP)

(73) Assignee: Keyence Corporation, Osaka (JP)

( * ) Notice: Subject to any disclaimer, the term of this patent is extended or adjusted under 35 U.S.C. 154(b) by 141 days.

(21) Appl. No.: 12/486,039

(22) Filed: Jun. 17, 2009

(65) Prior Publication Data

US 2010/0000334 A1    Jan. 7, 2010

(30) Foreign Application Priority Data

Jul. 1, 2008    (JP) .................................. 2008-172209

(51) Int. Cl.
*G01F 1/84* (2006.01)
*G01F 1/58* (2006.01)

(52) U.S. Cl. .............................. 73/861.355; 73/861.11

(58) Field of Classification Search .................. None
See application file for complete search history.

(56) References Cited

U.S. PATENT DOCUMENTS

| | | | | |
|---|---|---|---|---|
| 3,608,375 A | * | 9/1971 | Cushing | 73/861.12 |
| 3,739,640 A | * | 6/1973 | Folts | 73/861.16 |
| 4,279,168 A | * | 7/1981 | Wyler et al. | 73/861.353 |
| 4,459,857 A | * | 7/1984 | Murray et al. | 73/861.12 |
| 4,590,431 A | * | 5/1986 | Anderson et al. | 324/443 |
| 5,400,659 A | * | 3/1995 | Yokoi et al. | 73/861.12 |
| 6,920,799 B1 | * | 7/2005 | Schulz | 73/861.52 |

FOREIGN PATENT DOCUMENTS

WO    WO 91/08448    6/1991

* cited by examiner

*Primary Examiner* — Harshad Patel
(74) *Attorney, Agent, or Firm* — Kilyk & Bowersox, P.L.L.C.

(57) ABSTRACT

The flowmeter is provided with an oscillation circuit receiving supply of electric power in a non-insulated manner from an external power source and supplying the electric power to the coil to drive the magnetic substance, an insulating unit for insulating the coil from the magnetic substance and/or the electrically conductive fluid pipe, and a shielding unit being short-circuited to have a stable electric potential relative to the external power source and shielding the coil against the magnetic substance and the fluid pipe.

10 Claims, 8 Drawing Sheets

F I G. 5
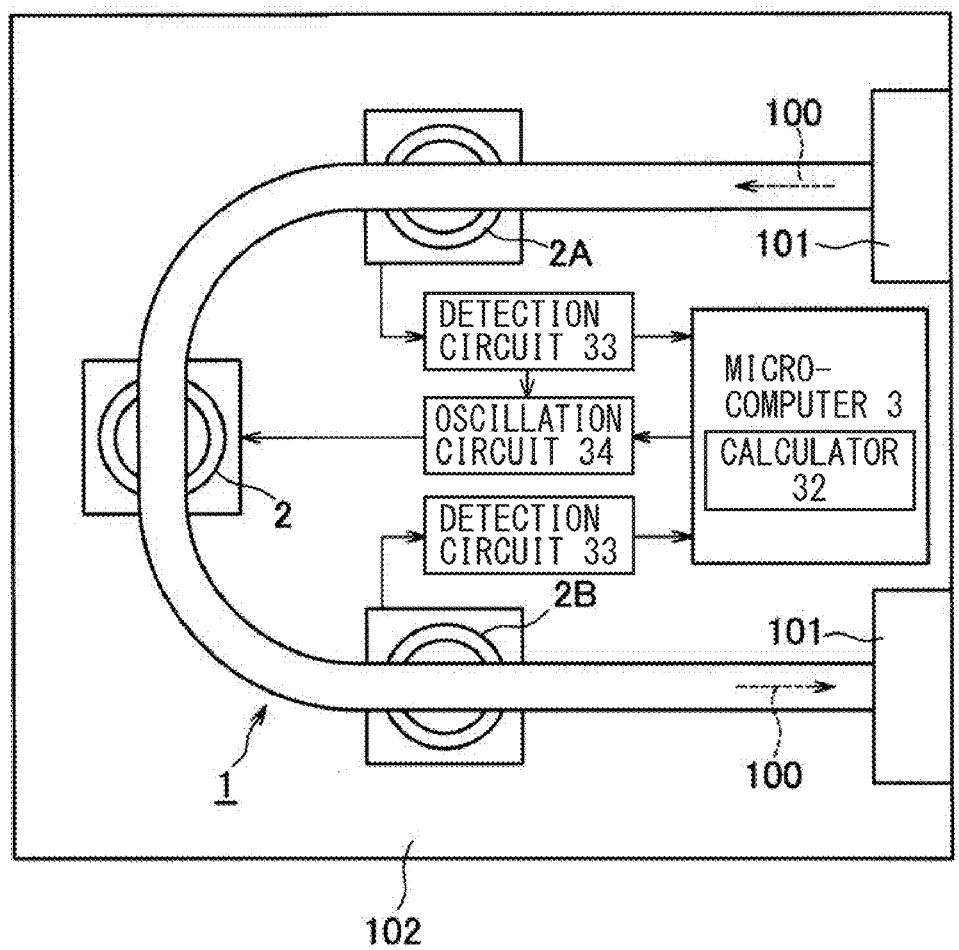

FLOWMETER WITH AN OSCILLATION CIRCUIT RECEIVING ELECTRIC POWER IN A NON-INSULATING MANNER

CROSS-REFERENCE TO RELATED APPLICATIONS

The present application claims foreign priority based on Japanese Patent Application No. 2008-172209, filed Jul. 1, 2008, the contents of which is incorporated herein by reference.

BACKGROUND OF THE INVENTION

1. Field of the Invention

The present invention relates to a mass flowmeter of Coriolis type that generates a force known as Coriolis force acting in proportion to the mass flow rate of a fluid passing through a pipe by forcibly oscillating the pipe, and determining the mass flow rate by detecting a phase difference of the vibrations on the upstream side and on the downstream side of the pipe.

2. Description of the Background Art

A flow meter of Coriolis type forcibly oscillates with an oscillator a fluid pipe for passing a fluid to be measured, detects a phase difference of the vibrations generated on the upstream side and on the downstream side of a flow path in accordance with a flow rate of the mass of a fluid, and determines the mass flow rate from the phase difference (WO91/08448 (abstract)).

Here, prior to the description of the problem of the present invention, a structure, a principle, and the like of a mass flowmeter of Coriolis type will be described.

In FIG. 4, for example, a substantially U-shaped fluid pipe 1 forms a flow path of a measurement fluid 100 to be measured. The measurement fluid 100 is introduced from one end of the fluid pipe 1, and passes through a bent portion and a straight-pipe portion to be ejected from the other end.

Both ends of the substantially U-shaped fluid pipe 1 are fixed to a wall portion 101. When this is seen from a viewpoint of structural mechanics, the wall portion 101 serving as a supporting member supports the fluid pipe 1 such that both ends of the fluid pipe 1 will be fixed ends relative to the vibration generated by the oscillation of a oscillator 2 described below, that is, it will be similar to a structure where the fluid pipe 1 is supported in a cantilever state. As a result, as shown in the model view of FIG. 6A, the fluid pipe 1 can be warped with an axis located at both ends inserted into the wall portion 101, that is, at the fixed ends of the vibration by the oscillation or in its vicinity.

In FIG. 4, an oscillator 2 is disposed at an intermediate portion in the fluid pipe 1. The oscillator 2 is made of a permanent magnet (magnetic substance) 21 fixed to the fluid pipe 1 and an electromagnetic driving coil 22 fixed on a base 102. The permanent magnet 21 is inserted into the electromagnetic driving coil 22, and oscillates the fluid pipe 1 when an alternating current is passed through the electromagnetic driving coil 22 by an oscillation circuit 34 (FIG. 5). That is, the electromagnetic driving coil 22 is disposed to correspond to the permanent magnet 21, and the permanent magnet 21 performs reciprocating movement in an axial direction within the electromagnetic driving coil 22.

On the other hand, the fluid pipe 1 is provided respectively with first and second detectors 2A, 2B. That is, the first and second detectors 2A, 2B are arranged to be spaced apart from each other on the upstream side and on the downstream side along a flow path 10 of the fluid pipe 1. Each of the detectors 2A, 2B is made of a well-known electromagnetic pickup, and is constituted with a detected element (magnetic substance) 23 made of a permanent magnet and a detection coil 24 corresponding to the detected element 23. The velocity of the vibration which is one of the vibration states in the vertical direction of the fluid pipe 1 is detected by an electric power that is generated by mutual reciprocating movement of the detected element 23 within the detection coil 24.

In FIG. 5, a signal related to the velocity of the vibration that has been detected by the first detector 2A passes through a detection circuit 33 to be transmitted to a calculator 32 of a microcomputer 3 and to be transmitted to an oscillation circuit 34. The oscillation circuit 34 supplies to the electromagnetic driving coil 22 constituting the oscillator 2 an electric current that accords to the magnitude and the positive/negative direction of the signal related to the velocity of the vibration that has been detected by the first detector 2A such that positive feedback may be applied. At this time, positive feedback is applied at a specific natural frequency of the fluid pipe 1 which is a frequency at which the vibration is difficult to be damped against the oscillation to generate an oscillated state, whereby the vibration at the basic natural frequency can be maintained at a constant level. Here, by adjusting the arrangement of the first detector 2A, the positive/negative direction of the positive feedback, and the like, the vibration of the fluid pipe 1 can be maintained at a specific frequency of higher order selectively from a plurality of the natural frequencies of the fluid pipe 1.

When a setting is made to oscillate at the basic natural frequency, the fluid pipe 1 vibrates while warping up and down in the order of the one-dot chain line L1, the solid line L0, and the two-dot chain line L2 of FIG. 6A by the oscillation.

On the other hand, by the oscillation and the flow of the measurement fluid 100 (FIG. 4), a force known as Coriolis force acts on the fluid pipe 1, whereby the fluid pipe 1 warps and vibrates up and down while being twisted as shown in FIG. 6B.

The magnitude of the Coriolis force is proportional to the mass of the fluid flowing within the fluid pipe 1, the velocity thereof, and the angular velocity of oscillation, and the direction of the force coincides with the direction of the vector product of the movement direction (velocity vector) of the fluid and the angular velocity at which the fluid pipe 1 is oscillated. Since the flow directions of the fluid will be opposite to each other between the inlet side and the outlet side of the fluid in the fluid pipe 1, the forces acting on the two straight pipe portions will be opposite to each other in the up-and-down direction. For this reason, a torque of twist is generated in the fluid pipe 1 by the Coriolis force. This torque changes with the same frequency as the oscillation frequency, and the amplitude value thereof will have a predetermined relationship with the mass flow rate of the fluid.

The warpage of the fluid pipe 1 of FIG. 6A by the oscillation and the twist of the fluid pipe 1 of FIG. 6B by the Coriolis force are superposed on each other. The calculator 32 of the microcomputer 3 of FIG. 5 calculates the mass of the measurement fluid 100 that passes through the flow path of the fluid pipe 1 based on the phase of the amplitude of the twist, that is, the phase difference of the velocity signals of vibration at respective positions constituting information of each vibration detected by the detectors 2A, 2B.

Here, there is an electric potential difference between the fluid pipe 1 or the permanent magnet 23 and the coil 22 of FIG. 4, and also the fluid pipe 1 and the coil 22 are close to each other. Therefore, when the fluid pipe 1 is made of a material having electric conductivity such as a metal, a noise may enter the detection signal by the capacitance coupling in some cases. In a general electronic appliance, the noise of the detection signal can be removed by a low-pass filter.

However, in a mass flow meter of Coriolis type, the flow rate is calculated by the phase difference between the two detection signals as described above, and this phase difference is a minute value. For this reason, even if the cut-off frequency of each low-pass filter is larger by several digits than the frequency of the vibration of the fluid pipe, the variation in the resistors and the capacitors constituting the two low-pass filters as well as the temperature characteristics have a great influence on the measurement precision. Therefore, the measurement precision decreases by the noise removal using the low-pass filter. Hereafter, this will be more specifically described.

For example, a study will be made in a case where the noise is removed by the low-pass filters in the two detection circuits 33, 33 of FIG. 5. Now, assuming that the cut-off frequency of the low-pass filters is 100 kHz, the damping at 1 MHz will be 20 dB.

Assuming that the fluid pipe vibration is 500 Hz and that the resistor or the capacitor of one low-pass filter is shifted by 5% from the other low-pass filter, the shift will be 0.25 mrad. Assuming that the full scale of the measurement range is 10 mrad, a shift of 2.5% will be generated relative to the full scale. When the cut-off frequency of the filters is lowered, this shift will further increase.

Due to these reasons, the decrease in the measurement precision cannot be prevented by the noise removal using the low-pass filter, so that the noise generation itself needs to be prevented. Thus, it can be considered that by short-circuiting between the ground in the inside of the detection circuit 33 and the fluid pipe 1 as depicted by the broken line shown in FIG. 7A to allow the two to have the same electric potential, the decrease in the measurement precision caused by the noise is prevented.

However, though this solution method can be adopted when the minus side of an external power source 50 of a user is grounded as shown in FIG. 7A, the method cannot be adopted in the case of the positive grounding in which the plus side Vcc of the external power source 50 is grounded as shown in FIG. 7B.

That is, in FIG. 7B, the minus side of the external power source 50 is short-circuited to the fluid pipe 1 via a power source line to the detection circuit 33, and is further grounded via a main pipe 51 of the fluid pipe 1. Therefore, when the plus side Vcc of the external power source 50 is grounded as shown by the two-dot chain line, the plus side Vcc and the minus side of the external power source 50 will be short-circuited.

On the other hand, since both of the minus grounding and the plus grounding are present for the user side, it is difficult for a manufacturer to adopt this solution method.

Therefore, in the conventional cases, in order to meet the plus grounding as well, a method is adopted in which an insulated power source is incorporated or an insulated power source is used as an external power source. For example, as shown in FIG. 8, when an electric power is supplied to the detection circuit 33 in a state of being insulated from the external power source 50, the situation as described above where the plus side Vcc and the minus side of the external power source 50 are short-circuited will not occur even if the detection circuit 33 is grounded and the plus side Vcc of the external power source 50 is grounded.

However, in the case of supplying an electric power to the detection circuit 33 in an insulated state, the whole circuit will be complex, and the costs will rise in accordance therewith.

The output signals and the like need to be output in an insulated state, and it causes an obstacle against the cost reduction of the flow meter.

Such a problem occurs not only in the detectors but also in the oscillators as well. That is, the vibration state of the oscillation will not be in an expected state due to the noise that has penetrated into the coil of the oscillator, thereby inviting decrease in the measurement precision.

Here, though WO91/08448 (abstract) discloses a magnetic shield to enhance the efficiency of the magnetism of a coil, no disclosure is given as to the shielding so as not to generate a noise in the coil.

Therefore, an object of the present invention is to enable electric power supply in a non-insulated state from an external power source in a Coriolis type mass flowmeter irrespective of whether the external power source is positively grounded or negatively grounded, and to prevent decrease in the measurement precision by preventing the generation of noise in the coil.

SUMMARY OF THE INVENTION

In order to achieve the object, a flowmeter of a first invention includes a fluid pipe forming a flow path for allowing a measurement fluid to flow therethrough and having electric conductivity; an oscillator constituted with a magnetic substance and a coil corresponding to the magnetic substance, where one of the magnetic substance and the coil is fixed to the fluid pipe to oscillate the fluid pipe; an oscillation circuit receiving supply of electric power in a non-insulated manner from an external power source and supplying the electric power to the coil in a non-insulated manner so as to drive the magnetic substance; a plurality of detectors that are disposed to be spaced apart from each other along the flow path of the fluid pipe to detect a state of vibration of the fluid pipe; a calculator that calculates a mass flow rate of the measurement fluid that passes through the flow path of the fluid pipe based on each vibration that is detected by the plurality of detectors; an insulating unit for insulating the coil from the magnetic substance and/or the electrically conductive fluid pipe; and a shielding unit being short-circuited to have a stable electric potential relative to the external power source and shielding the coil against the magnetic substance and the fluid pipe.

On the other hand, a flowmeter of a second invention includes a fluid pipe forming a flow path for allowing a measurement fluid to flow therethrough and having electric conductivity; an oscillator including a coil and a magnetic substance for oscillating the fluid pipe; an oscillation circuit receiving supply of electric power in a non-insulated manner from an external power source and supplying the electric power to the coil in a non-insulated manner to drive the magnetic substance; a plurality of detectors that are disposed to be spaced apart from each other along the flow path of the fluid pipe to detect a state of vibration of the fluid pipe; and a calculator that calculates a mass flow rate of the measurement fluid that passes through the flow path of the fluid pipe based on each vibration that is detected by the plurality of detectors, wherein each of the plurality of detectors is constituted with a magnetic substance and a coil corresponding to the magnetic substance, where one of the magnetic substance and the coil is fixed to the fluid pipe to generate an electric power by relative reciprocating movement of the magnetic substance and the coil that is caused by the vibration of the fluid pipe, and the plurality of detectors further includes an insulating unit for insulating the coil of the detectors from the magnetic substance and/or the electrically conductive fluid pipe; and a shielding unit being short-circuited to have a stable electric potential relative to the external power source and shielding the coil of the detectors against the magnetic substance of the detectors and the fluid pipe.

According to the present invention, the noise is hardly generated in the coil because the coil is shielded against the magnetic substance and the fluid pipe by the shielding unit that is short-circuited to have a stable electric potential to the external power source, and the capacitance coupling of the coil to the magnetic substance and the fluid pipe is shut off.

Here, since an electric power is supplied in an non-insulated manner from the external power source, an insulated power source is not needed, thereby leading to decrease in the costs.

The coil is insulated from the magnetic substance and/or the fluid pipe, and the ground in the inside of the oscillation circuit and the detection circuit is not short-circuited to the electric potential of the fluid pipe, the present invention can be adopted even if the external power source is positively grounded.

BRIEF DESCRIPTION OF THE DRAWINGS

FIG. 5 is a schematic constitutional view of the same;

DESCRIPTION OF THE PREFERRED EMBODIMENTS

In a preferable aspect of the present invention, the insulating unit is constituted with an insulator that forms a bobbin for winding the coil. In this aspect, the certainty of insulation is high, and there is no need to provide an insulating unit separately.

That is, since the distance of the coil to the fluid pipe and the magnetic substance is short, the insulation decreases when the bobbin is made of a metal, so that an insulating unit needs to be separately provided at a part where the metal bobbin is fixed to the frame. However, according to this aspect, there is no need to provide the insulating unit separately.

The shielding unit is preferably constituted with a conductor that is disposed in the bobbin for winding the coil. In this case, the certainty of shielding the coil against the magnetic substance and the fluid pipe will be high.

In a preferred example of the present invention, the bobbin for winding the coil is formed by lamination of an insulator constituting the insulating unit and a conductor constituting the shielding unit onto each other.

In this case, the certainty of insulation and shielding will be high. In addition, the number of components will decrease because the two units are constituted with the bobbin obtained by lamination of an insulator and a conductor. Moreover, there is no fear that the flowmeter will have a large scale.

In this case, it is more preferable that the bobbin includes a tubular trunk part in which the bobbin winds the coil and flange parts that are disposed at both ends of the trunk part, wherein the trunk part and the flange parts are formed by lamination of the insulator and the conductor, respectively.

Here, as the conductor, for example, various alloys such as copper, aluminum, and iron can be used. An insulator is essentially a substance that does not conduct electricity. As the insulator, a resin for example can be used.

EXAMPLES

Hereafter, one example of the present invention will be described with reference to the attached drawings.

Figure 4:
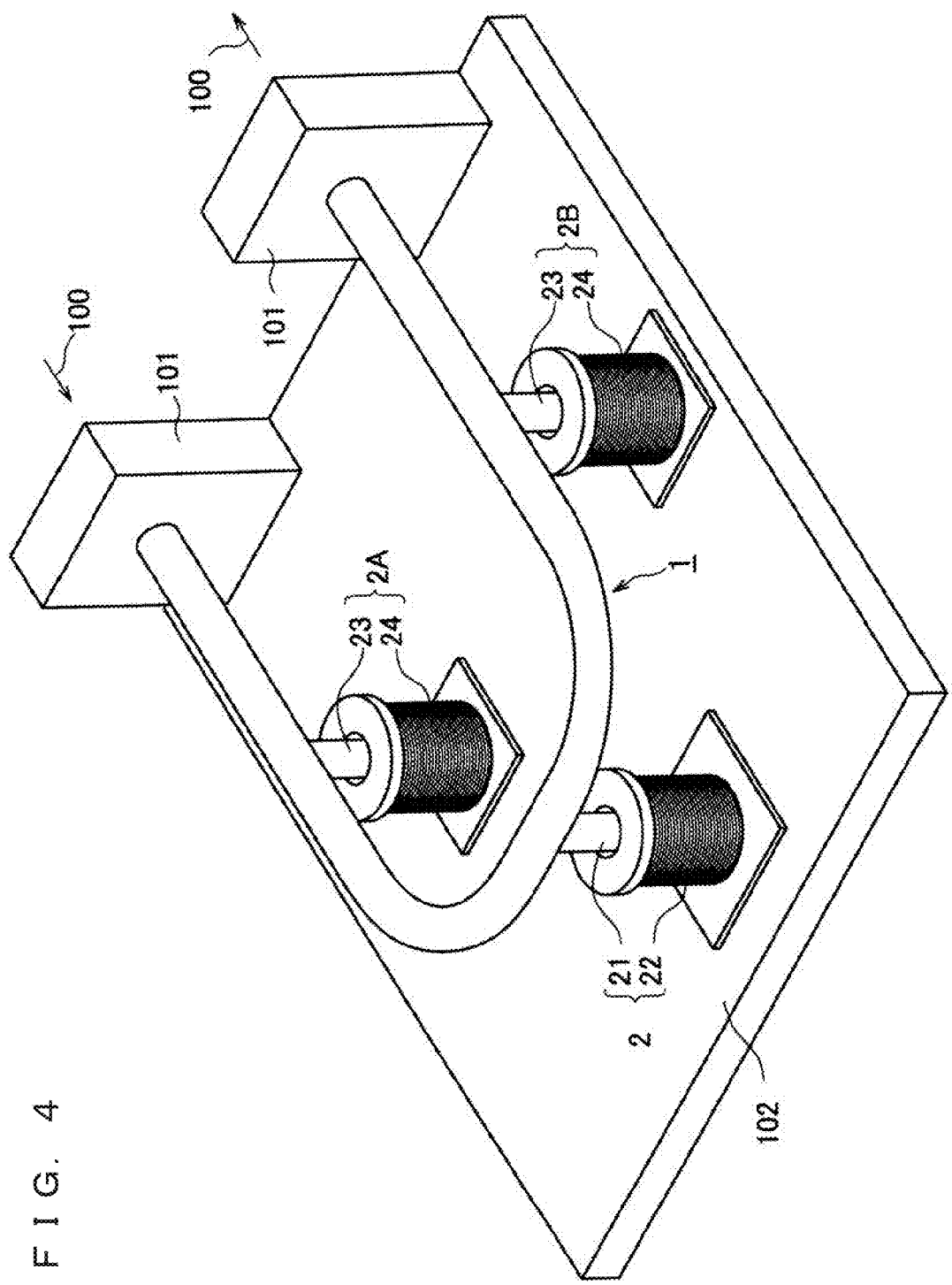
FIG. 4 is a schematic perspective view for describing a principle of the flowmeter.
Figure 6A:
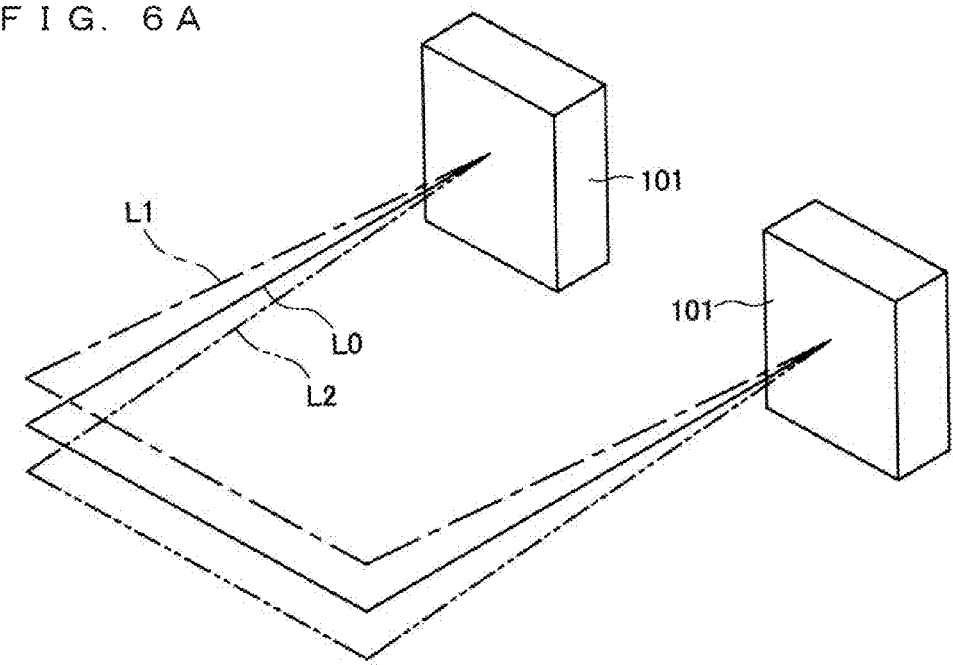
FIGS. 6A and 6B are perspective views illustrating a principle of the flow meter.
Figure 6B:
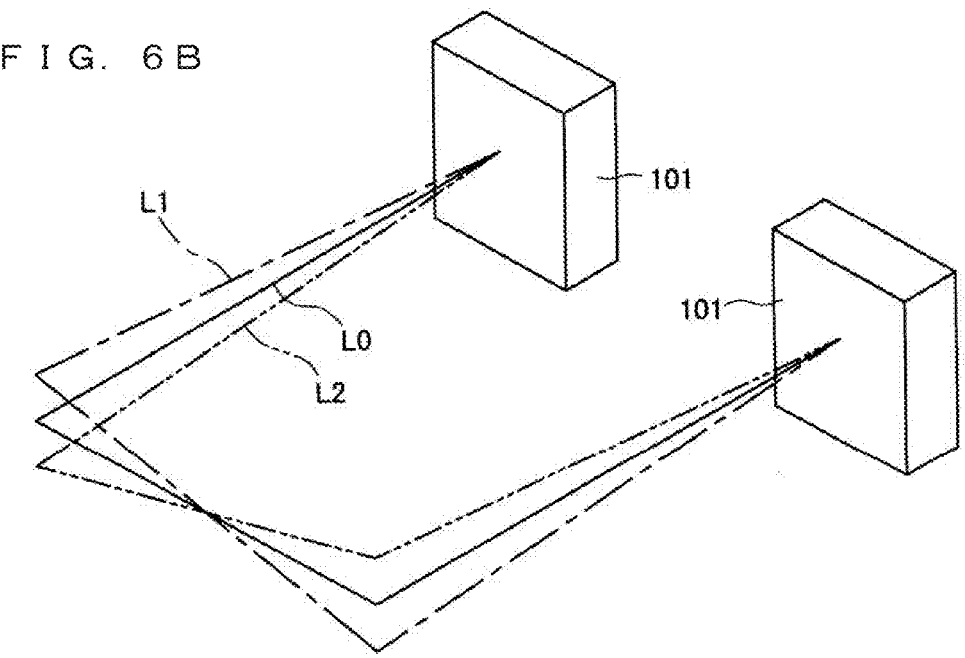
Figure 7A:
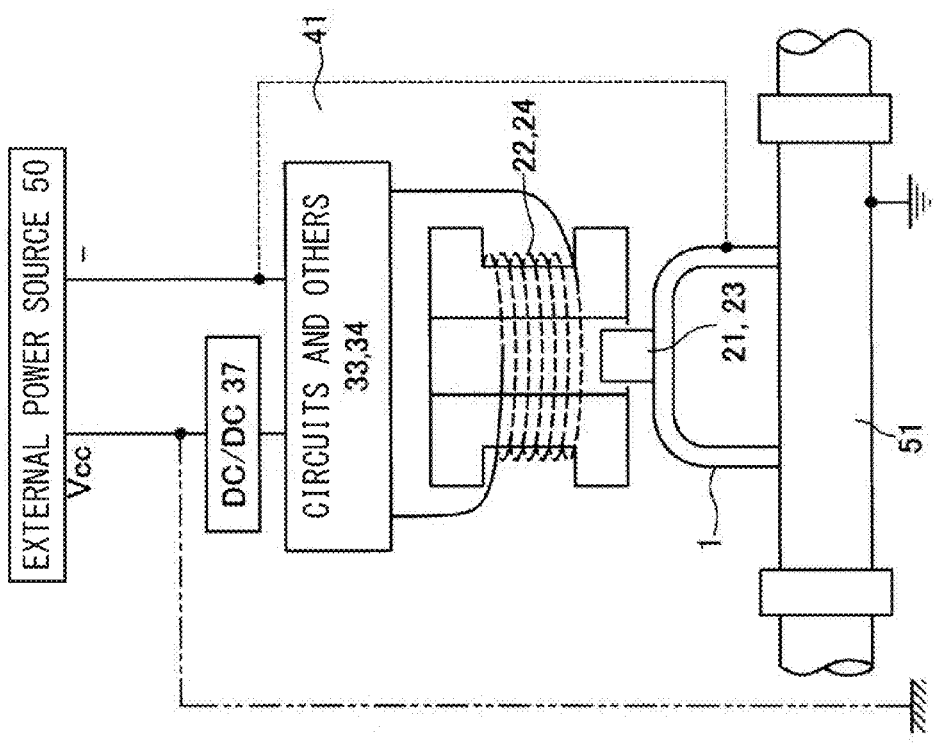
FIGS. 7A and 7B are conceptual views illustrating unknown examples in which a non-insulated power source cannot be used in the flowmeter.
Figure 7B:
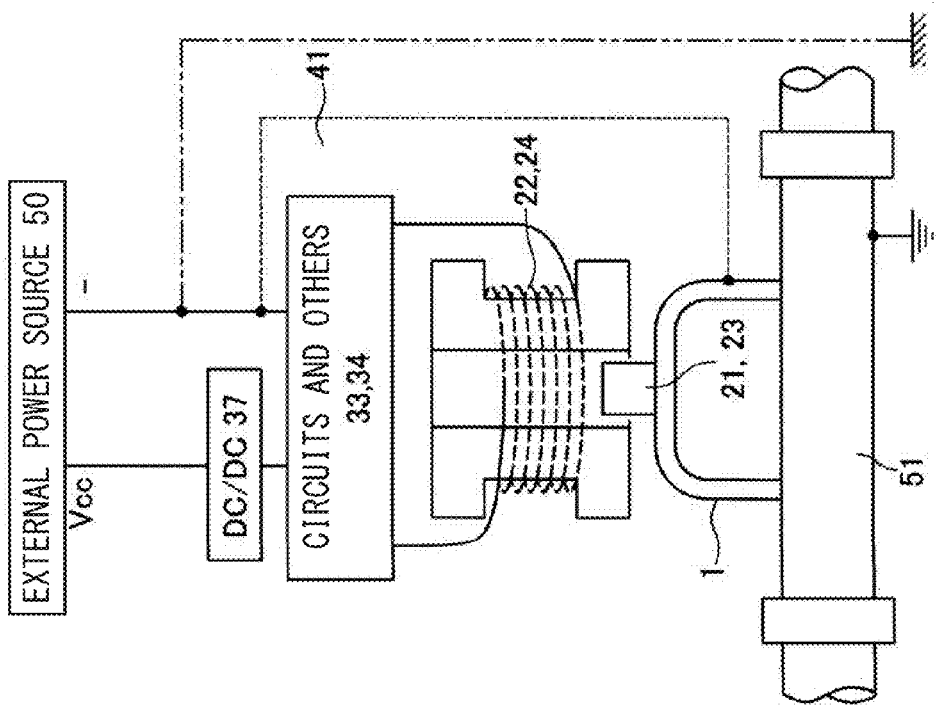
Figure 8:
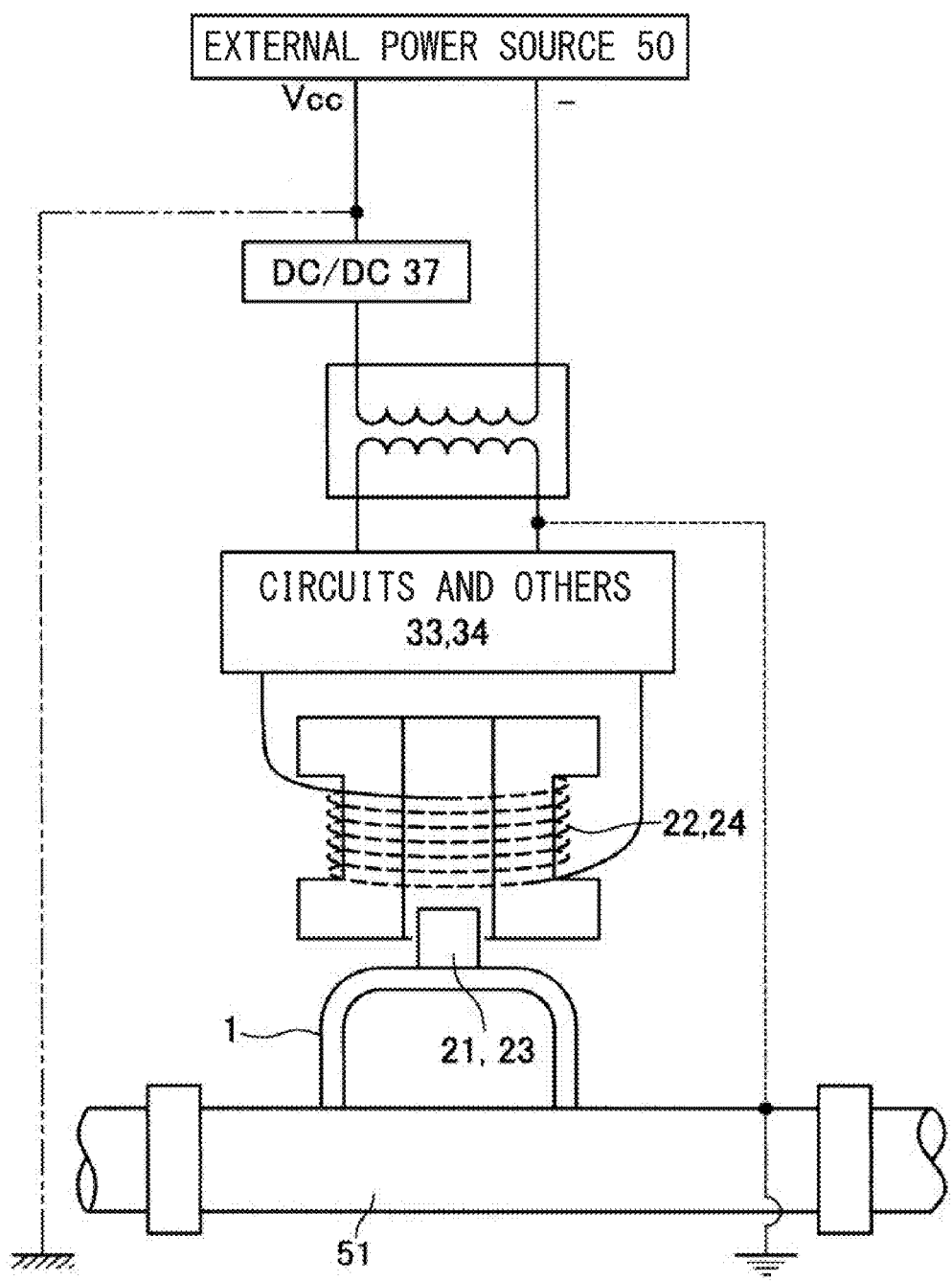
FIG. 8 is a conceptual view illustrating a conventional example in which an insulated power source is used in the flowmeter.

The mechanical structure and the principle of a mass flowmeter of Coriolis type to which the present invention is applied is described as in FIGS. 4 to 6, so that the description thereof will not be given.

Figure 1:
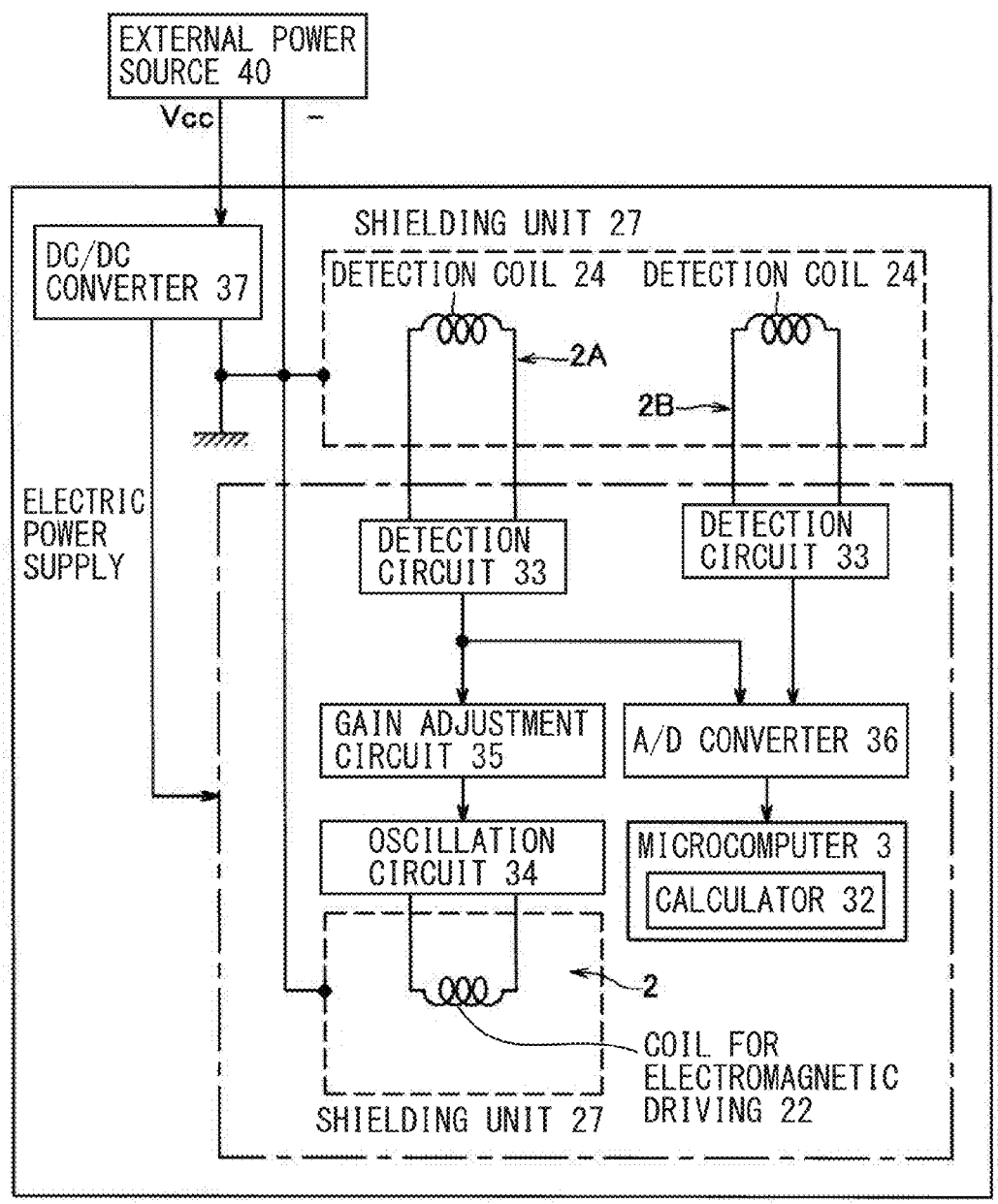
FIG. 1 is a schematic block diagram of a circuit illustrating one example of the flow meter of the present invention.

As illustrated in FIG. 1, an electric power is supplied to each of circuits 32 to 36 of a flowmeter of Coriolis type in a non-insulated manner from a direct-current power source which is an external power source 40 via a DC/DC converter 37.

Here, the DC/DC converter 37 lowers the voltage of the external power source 40.

A signal related to the velocity of vibration that has been detected by a first detector 2A of FIG. 1 passes through one detection circuit 33 and the gain adjustment circuit 35 to be transmitted to the oscillation circuit 34. The oscillation circuit 34 supplies an electric current corresponding to the magnitude and the positive or negative direction of the signal related to the velocity of the vibration that has been detected by the first detector 2A to an electromagnetic driving coil 22 constituting an oscillator 2 so as to provide a positive feedback. This oscillates the fluid pipe 1 as described above.

Meanwhile, the signals related to the velocity of the vibrations that have been detected by the first and second detectors 2A, 2B pass respectively through the detection circuits 33, 33 and the A/D converter 36 to be transmitted to a calculator 32 of a microcomputer 3. The calculator 32 calculates the mass of a measurement fluid 100 that passes through the flow path of the fluid pipe 1 of FIG. 5 based on the phase of the amplitude of the twist, that is, the phase difference of the velocity signal of the vibration at each position which is information of each vibration that has been detected by each of the detectors 2A, 2B.

Here, the signal related to the calculated mass may be output in a non-insulated manner to an electronic appliance of a user.

Figure 2:
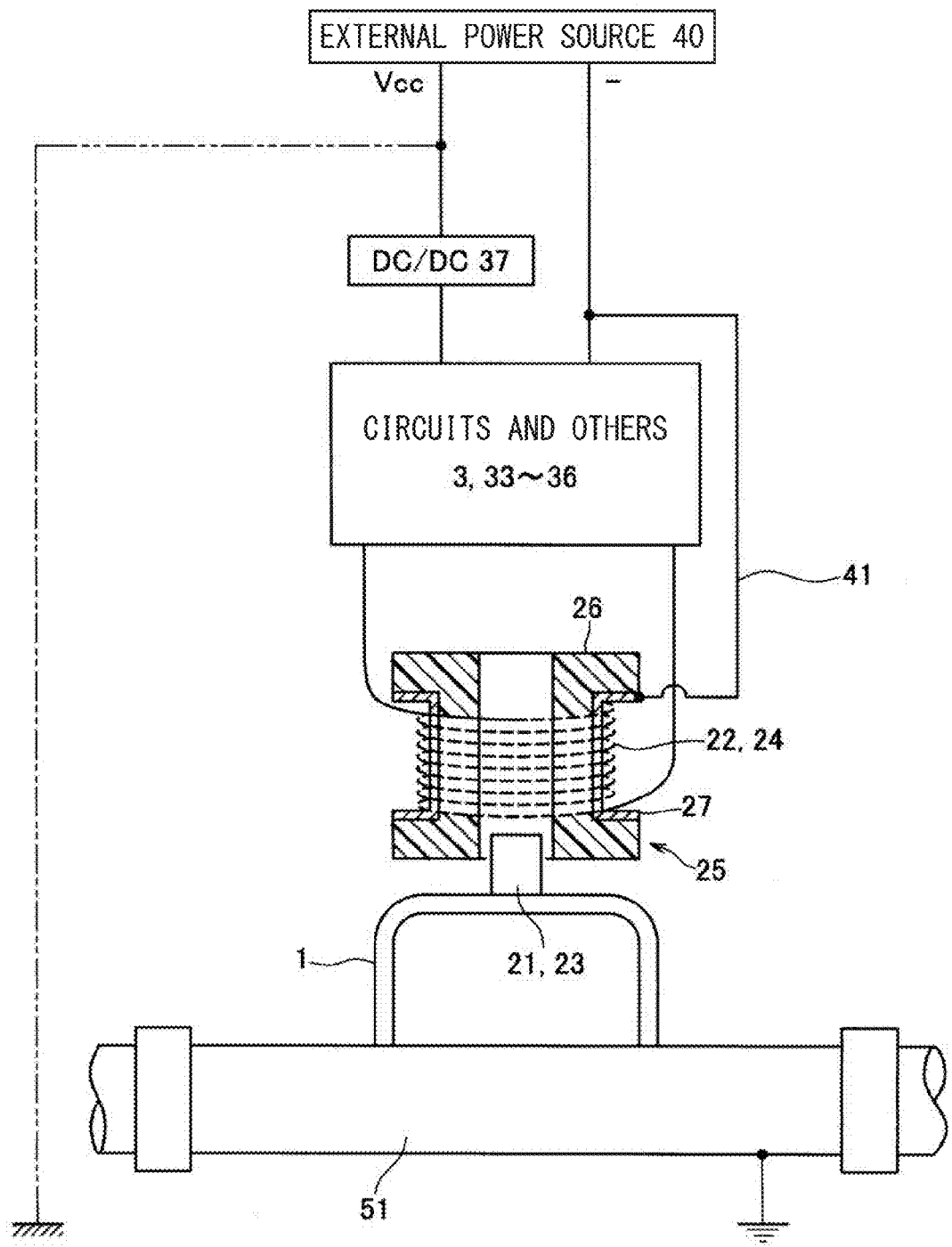
FIG. 2 is a conceptual view illustrating a grounded and insulated state in the present flowmeter.

FIG. 2 is a model view illustrating an essential part of the present invention.

As illustrated in FIG. 2, each of coils 22, 24 is wound around a bobbin 25. Each of magnetic substances 21, 23 (a permanent magnet 21 or a detected element 23) is inserted into the bobbin 25. The bobbin 25 is made by lamination of a synthetic resin constituting an insulator and a metal constituting a conductor, and is provided with an insulating unit 26 and a shielding unit 27.

The insulating unit 26 made of the synthetic resin layer insulates each of the coils 22, 24 from each of the magnetic substances 21, 23 and the electrically conductive fluid pipe 1. The fluid pipe 1 is connected to a main pipe 51, and is in a state of being grounded via the main pipe 51.

Here, when the plus side Vcc of the external power source 40 is grounded to the earth as shown by a two-dot chain line, the electric potential of the fluid pipe 1 will also be Vcc. However, since each of the coils 22, 24 is insulated from the fluid pipe 1 or each of the magnetic substances 21, 23 by the insulating unit 26 of the bobbin 25, there is no fear that the plus side Vcc and the minus side of the external power source 40 will be short-circuited.

Here, such a short circuit is not generated, even in a case where the minus side of the external power source 40 is grounded.

The shielding unit 27 is short-circuited to the negative electric potential of the external power source 40 via an electric wire 41. That is, the shielding unit 27 is short-circuited to have an electric potential that is stable relative to the external power source 40, so that the shielding unit 27 made of the metal layer can shield each of the coils 22, 24 against the magnetic substance 23 and the fluid pipe 1. Therefore, the decrease in the measurement precision caused by the noise in the coils 22, 24 can be prevented.

Next, a specific structure example of the insulating unit 26 and the shielding unit 27 will be described.

Figure 3A:
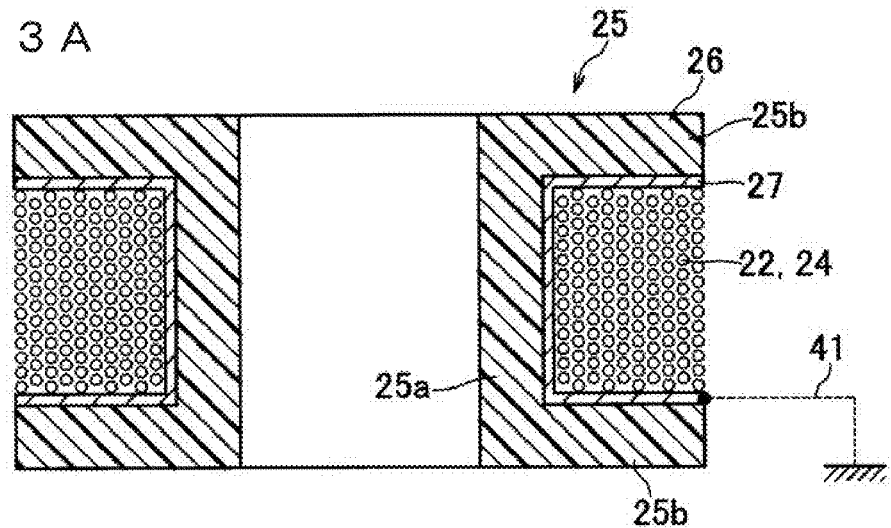
FIGS. 3A to 3C are enlarged cross-sectional views illustrating examples of the bobbin.
Figure 3B:
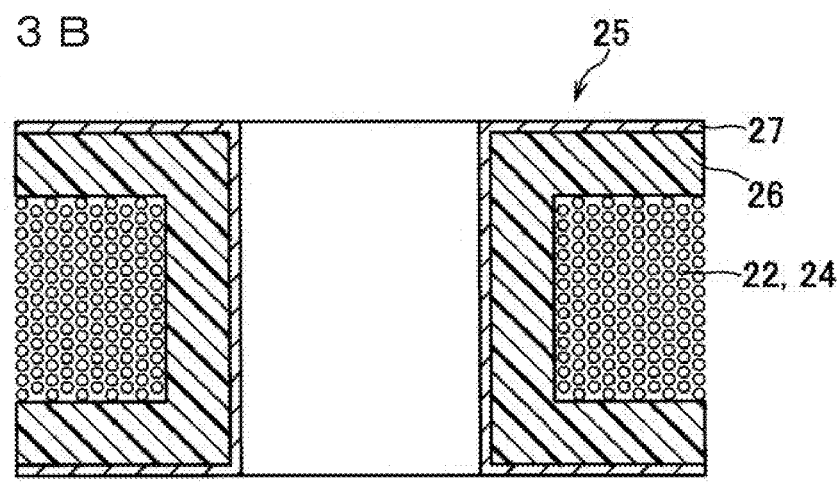

In the bobbin 25 shown in FIG. 3B, a plating layer or a metal foil such as copper is bonded onto the bobbin main body made of synthetic resin constituting the insulating unit 26 to form the shielding unit 27. That is, the bobbin 25 is provided with a tubular trunk part 25a for winding the coils 22, 24 and flange parts 25b at both ends of the trunk part 25a, and each of the trunk part 25a and the flange parts 25b is formed by lamination of the insulator made of the synthetic resin and the conductor made of plating or the like.

Here, the surface to be plated in the bobbin 25 may be suitably selected as shown in FIG. 3A or 3B.

Figure 3C:
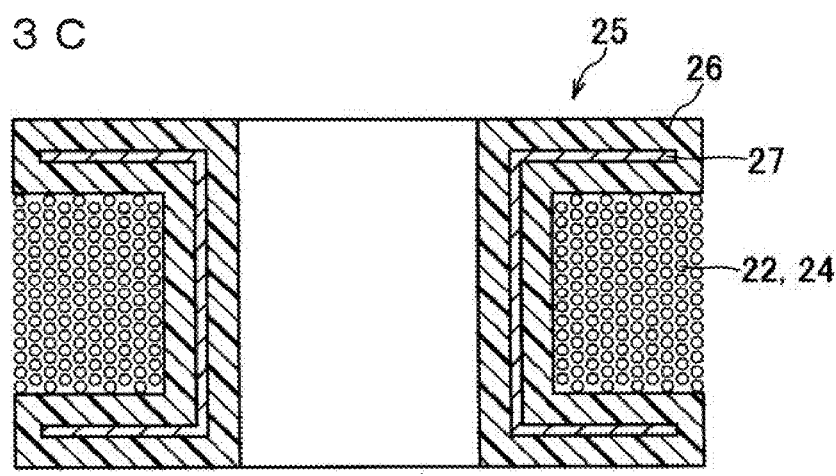

Referring to FIG. 3C, the shielding unit 27 made of a metal core may be embedded in the bobbin main body made of synthetic resin to laminate the insulating unit 26 and the shielding unit 27.

Incidentally, in the example, the shielding unit 27 of FIG. 2 is short-circuited to the electric potential on the minus side of the external power source 40. However, in the present invention, it may be sufficient that the shielding unit 27 is short-circuited to have an electric potential that is stable relative to the external power source 40, for example, the shielding unit 27 may be grounded to the plus side of a constant-voltage circuit within the external power source 40.

In the present invention, the coils 22, 24 may be fixed to the fluid pipe 1, and the magnetic substances 21, 23 may be fixed to a frame or the like.

There is no need to form the insulating unit 26 with the bobbin 25. For example, when the coils 22, 24 are fixed to the fluid pipe 1, a resin plate may be disposed between the fluid pipe 1 and the bobbin 25 to insulate between the fluid pipe 1 and the coils 22, 24, or to insulate only between the coils 22, 24 and the magnetic substances 21, 23.

Here, the fluid pipe 1 may be formed with a straight pipe. A pair of fluid pipes 1 may be provided to be parallel to each other.

The present invention can be applied to what is known as a Coriolis type mass flowmeter.

What is claimed is:

1. A flowmeter comprising:
    a fluid pipe forming a flow path for allowing a measurement fluid to flow therethrough and having electric conductivity;
    an oscillator constituted with a magnetic substance and a coil corresponding to the magnetic substance, where one of the magnetic substance and the coil is fixed to the fluid pipe to oscillate the fluid pipe;
    an oscillation circuit receiving supply of electric power in a non-insulated manner from an external power source and supplying the electric power to the coil in a non-insulated manner so as to drive the magnetic substance;
    a plurality of detectors that are disposed to be spaced apart from each other along the flow path of the fluid pipe to detect a state of vibration of the fluid pipe;
    a calculator that calculates a mass flow rate of the measurement fluid that passes through the flow path of the fluid pipe based on each vibration that is detected by the plurality of detectors;
    an insulating unit for insulating the coil from the magnetic substance and/or the electrically conductive fluid pipe; and
    a shielding unit being short-circuited to have a stable electric potential relative to the external power source and shielding the coil against the magnetic substance and the fluid pipe.

2. The flowmeter according to claim 1, wherein the insulating unit is constituted with an insulator that forms a bobbin for winding the coil.

3. The flowmeter according to claim 1, wherein the shielding unit is constituted with a conductor that is disposed in the bobbin for winding the coil.

4. The flowmeter according to claim 1, wherein the bobbin for winding the coil is formed by lamination of an insulator constituting the insulating unit and a conductor constituting the shielding unit onto each other.

5. The flowmeter according to claim 4, wherein the bobbin comprises a tubular trunk part in which the bobbin winds the coil and flange parts that are disposed at both ends of the trunk part, wherein the trunk part and the flange parts are formed by lamination of the insulator and the conductor, respectively.

6. A flowmeter comprising:
    a fluid pipe forming a flow path for allowing a measurement fluid to flow therethrough and having electric conductivity;
    an oscillator including a coil and a magnetic substance for oscillating the fluid pipe;
    an oscillation circuit receiving supply of electric power in a non-insulated manner from an external power source and supplying the electric power to the coil in a non-insulated manner to drive the magnetic substance;
    a plurality of detectors that are disposed to be spaced apart from each other along the flow path of the fluid pipe to detect a state of vibration of the fluid pipe; and
    a calculator that calculates a mass flow rate of the measurement fluid that passes through the flow path of the fluid pipe based on each vibration that is detected by the plurality of detectors,
    wherein each of the plurality of detectors is constituted with a magnetic substance and a coil corresponding to the magnetic substance, where one of the magnetic substance and the coil is fixed to the fluid pipe to generate an electric power by relative reciprocating movement of the magnetic substance and the coil that is caused by the vibration of the fluid pipe, and
    the plurality of detectors further comprise:
    an insulating unit for insulating the coil of the detectors from the magnetic substance and/or the electrically conductive fluid pipe; and
    a shielding unit being short-circuited to have a stable electric potential relative to the external power source and shielding the coil of the detectors against the magnetic substance of the detectors and the fluid pipe.

7. The flowmeter according to claim 6, wherein the insulating unit is constituted with an insulator that forms a bobbin for winding the coil.

8. The flowmeter according to claim 6, wherein the shielding unit is constituted with a conductor that is disposed in the bobbin for winding the coil.

9. The flowmeter according to claim 6, wherein the bobbin for winding the coil is constituted by lamination of an insulator constituting the insulating unit and a conductor constituting the shielding unit onto each other.

10. The flowmeter according to claim 9, wherein the bobbin comprises a tubular trunk part in which the bobbin winds the coil and flange parts that are disposed at both ends of the trunk part, wherein the trunk part and the flange parts are formed by lamination of the insulator and the conductor, respectively.

* * * * *